US005140364A

United States Patent [19]

Nakayama

[11] Patent Number: 5,140,364

[45] Date of Patent: Aug. 18, 1992

[54] SHEET TRANSPORTING APPARATUS

[75] Inventor: Osamu Nakayama, Nara, Japan

[73] Assignee: Sharp Kabushiki Kaisha, Osaka, Japan

[21] Appl. No.: 641,428

[22] Filed: Jan. 15, 1991

[30] Foreign Application Priority Data

Jan. 23, 1990 [JP] Japan .................................... 2-14311

[51] Int. Cl.[5] ........................ G03B 27/48; G03B 27/50

[52] U.S. Cl. ........................................ 355/50; 355/316; 271/9

[58] Field of Search .................. 355/309, 316, 321, 50; 271/9, 258, 259, 265, 266

[56] References Cited

U.S. PATENT DOCUMENTS 4,070,226 1/1978 Crathern et al. ........................ 271/9
4,332,375 6/1982 Tsubo .................................. 271/9
4,417,282 11/1983 Yamamoto .............................. 271/9
4,522,382 6/1985 Chu et al. ............................. 271/9
4,530,591 7/1985 Mastuyama et al. ................. 355/50

FOREIGN PATENT DOCUMENTS 122179 4/1989 Japan .
160145 12/1989 Japan .

*Primary Examiner*—Monroe H. Hayes
*Attorney, Agent, or Firm*—David G. Conlin; Thomas M. DiMauro; Donald R. Castle

[57] ABSTRACT

A sheet transporting apparatus, for transporting a sheet from a sheet supplying device to a sheet supplied device, includes a transporting path, through which the sheet is transported, and a plurality of driving rollers disposed along the transporting path. The plurality of driving rollers are adapted to independently rotate so as to transport the sheet through the transporting path by sequentially rotating in a prescribed manner based on a position of the transported sheet. The sheet transporting apparatus also includes a coupling device for selectively coupling and decoupling the driving rollers to each other. The sheet transporting apparatus further includes a device, such as a knob, for rotating one of the driving rollers.

11 Claims, 2 Drawing Sheets

SHEET TRANSPORTING APPARATUS

BACKGROUND OF THE INVENTION

1. Field of the Invention

The present invention relates to an apparatus for transporting a sheet, which is utilized, for example, in a copying apparatus.

2. Description of the Related Art

A sheet transporting apparatus is utilized in various kinds of apparatuses such as a copying apparatus, a printing apparatus etc., in which copying sheets etc. are to be transported sequentially and speedily one after another.

Such a transporting apparatus includes a plurality of transporting rollers.

In case that such a sheet transporting apparatus is utilized in a copying apparatus having a plurality of sheet supplying trays with the function of both-side-copy operation, the transporting path for the copying sheet is made rather complicated and long. Accordingly, in this case, a large number of the transporting rollers are required to deal with the complicated and long path.

In this type of sheet transporting apparatus, some transporting rollers are not coupled to other transporting rollers and are rotated independently from each other, so that the sequential transportation of the sheet through the long and complicated path is enabled by controlling the driving condition of each transporting roller in a prescribed manner, in accordance with the position of the transported copying sheet and the selected tray.

In this type of sheet transporting apparatus, since such a driving control manner that some transporting rollers are rotated while other transporting rollers are stopped, is possible, the copying sheet can be transported to some midway of the transporting path before the transportation of the previous copying sheet is completed, with a benefit of increasing the total copying speed.

In the above mentioned sheet transporting apparatus, when an abnormal condition of the transported sheet occurs, for example, when the copying sheet is jammed in the transporting path, the driving of the transporting rollers are stopped. At this moment, since the jammed sheet is not necessarily positioned at a place where the jammed sheet can be removed by an operator, the transporting rollers are manually rotated by the operator, so that the jammed sheet is moved to some other position of the transporting path where the jammed sheet can be removed by the operator.

In this removing operation, however, since the plurality of rollers are not coupled to each other, it is necessary to rotate different rollers one after another until the jammed sheet reaches the desired position for removing, resulting in a time consuming and troublesome removing operation.

SUMMARY OF THE INVENTION

It is therefore an object of the present invention to provide a sheet transporting apparatus, which allows an easy removing operation of the transported sheet when an abnormal condition, such as a jamming condition, occurs to the transported sheet.

According to the present invention, the above mentioned object can be achieved by a sheet transporting apparatus for transporting a sheet from a sheet supplying device to a sheet supplied device. The sheet transporting apparatus includes a transporting path, through which the sheet is transported, and a plurality of driving rollers disposed along the transporting path. The plurality of driving rollers are adapted to independently rotate so as to transport the sheet through the transporting path by sequentially rotating in a prescribed manner based on a position of the transported sheet. The sheet transporting apparatus also includes a coupling device for selectively coupling and decoupling the driving rollers to each other. The sheet transporting apparatus further includes a device, such as a knob, for rotating one of the driving rollers.

In the sheet transporting apparatus, the sheet is transported through the transporting path by the sequential rotation of the driving rollers, which are adapted to independently rotate, with a relatively high transporting efficiency, in the normal transporting operation. During this normal transporting operation, the driving rollers are decoupled to each other by the coupling device. Here, when an abnormal condition, such as a jamming condition, of the transported sheet occurs in a midway of the transporting path, the driving rollers can be coupled to each other by the coupling device while the driving rollers are stopped to rotate. Then, all of the coupled driving rollers can be rotated simultaneously just by rotating the rotating device, such as a knob for manual rotating operation for example, until the sheet is moved from an arbitrary position to a desired position where the sheet can be easily removed from the transporting apparatus by the operator. Then, when this removing operation is completed, the transporting operation can be resumed after the coupling device decouples the driving rollers to each other.

As described above, according to the present invention, when the abnormal condition, such as a jamming condition, occurs, the removing operation of the transported sheet cam be performed quite easily.

Further objects and advantages of the present invention will be apparent from the following description of the preferred embodiment of the invention as illustrated in the accompanying drawings.

DETAILED DESCRIPTION OF THE PREFERRED EMBODIMENT

A preferred embodiment of the present invention will be described below with reference to the accompanying drawings.

Figure 1:
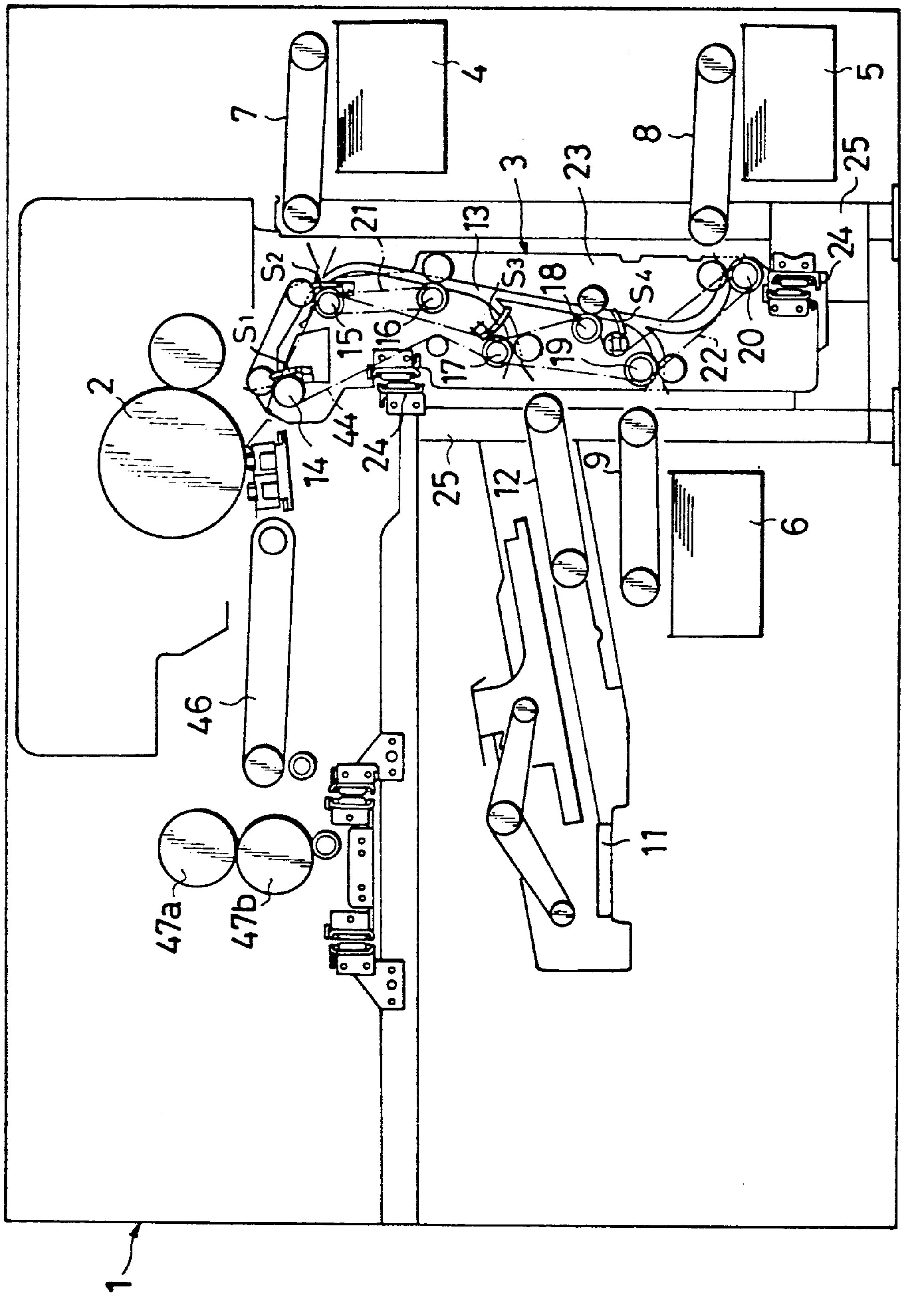
FIG. 1, is a schematic internal constructional view of a copying apparatus equipped with a sheet transporting unit as an embodiment of the present invention.

FIG. 1, shows a copying apparatus including a sheet transporting unit as an embodiment according to the present invention.

In FIG. 1, the reference nummeral 1 designates a main body of the copying apparatus. A photo-sensitive drum 2 is equipped in the main body 1 at its right upper portion. A sheet transporting unit 3 is mounted in the main body 1 at the right lower side of the photo-sensitive drum 2.

First and second sheet supplying trays 4 and 5 are provided at the right side of the sheet transporting unit 3 in a two stage structure, while a third sheet supplying tray 6 is provided at the other side of the sheet transporting unit 3 opposing to the second sheet supplying tray 5.

Sheet supplying rollers 7, 8 and 9 are provided at each upper side of trays 4, 5 and 6 respectively. Each supplying roller 7, 8, 9 is adapted to transport, toward the sheet transporting unit 3, each copying sheet accommodated on each tray 7, 8, 9 one by one in the order from the uppermost one.

An intermediate tray 11 is provided at a central lower portion of the main body 1. The intermediate tray 11 is adapted to temporarily accommodate the copying sheet which has undergone the one-side-copy operation and waits for the following other-side-copy operation when the both-side-copy operation is to be performed.

A sheet supplying roller 12 is equipped above the sheet supplying roller 9, for transporting the copying sheet from the intermediate tray 11 toward the sheet transporting unit 3.

A sheet transporting path 13 is provided in the sheet transporting unit 3. The sheet transporting path 13 extends vertically from the right lower side of the photo-sensitive drum 2 to the lower portion of the main body 1, and has entrances for the copying sheet, each of which opens to the sheet supplying rollers 7, 8, 9 and 12 respectively. A plurality of transporting rollers are arranged along the transporting path 13, so as to transport each copying sheet supplied from each tray 4, 5, 6, 11 to the lower right side of the photo-sensitive drum 2.

Here, the plurality of transporting rollers along the transporting path 13 include first, second and third driving rollers 14, 15 and 17, and first, second, third and fourth driven rollers 16, 18, 19 and 20.

The first driving roller 14 is disposed at the upper end portion of the sheet transporting unit 3 in the vicinity of the photo-sensitive drum 2.

The second driving roller 15 is disposed in the vicinity of the entrance for the first sheet tray 4 so as to transport the copying sheet therefrom.

The first driven roller 16 is disposed below the second driving roller 15 and is driven by the second driving roller 15 by use of a first timing belt 21 which is wound on those rollers 15 and 16.

The third driving roller 17 is disposed below the first driven roller 16 in the vicinity of the entrance for the intermediate tray 11 so as to transport the copying sheet therefrom.

The second, third and fourth driven rollers 18, 19 and 20 are disposed below the third driving roller 17 and are driven by the third driving roller 17 by use of a second timing belt 22 which is wound on those rollers 17, 18, 19 and 20.

The third driven roller 19 is disposed in the vicinity of the entrance for the third sheet tray 6 so as to transport the copying sheet therefrom.

The fourth driven roller 20 is disposed in the vicinity of the entrance for the second sheet tray 5 so as to transport the copying sheet therefrom.

The first, second and third driving rollers 14, 15 and 17 are in a decoupled condition to each other, as described later, such that each rotational driving force is independently transmitted to each driving rolers 14, 15, 17 from the driving source of the main body 1.

The first timing belt 21 couples the second driving roller 15 with the first driven roller 16. The second timing belt 22 couples the third driving roller 17 with the second, third and fourth driven rollers 18, 19 and 20.

As described above, the sheet transporting unit 3 is divided into three transporting sections, each of which can be independently operated, i.e. an upper transporting section including the first driving roller 14, an intermediate transporting section including the second driving roller 15 and the coupled first driven roller 16, and a lower transporting section including the third driving roller 17 and the coupled second, third and fourth driven rollers 18, 19 and 20.

The sheet transporting unit 3 thus constructed is adapted to transport the copying sheet by switching the driving conditions of those three transporting sections one after another in a prescribed manner according to the position of the copying sheet in the transporting path 13 and the selected tray 4, 5, 6 or 11. In order to realize this prescribed manner of transportation, a plurality of sensors S1 to S4 are arranged along the transporting path 13 in order to detect such a position of the transported copying sheet and output the signal corresponding to the detected position so as to enable the driving control of the driving rollers 14, 15 and 17.

The sheet transporting unit 3 is detachably mounted in a frame 25 of the main body 1 such that a side plate 23 of the transporting unit 3 is set on slide rails 24 which are disposed at the right lower portion and the left upper portion of the frame 25 and extend in a wide direction of the main body 1.

In case of the removing operation of the jammed sheet as described later, the sheet transporting unit 3 is drawn out of the main body 1 sideward along the slide rails 24.

The driving mechanism of the driving rollers 14, 15 and 17, and the driven rollers 16, 18, 19, 20 will be explained hereinbelow.

Figure 2:
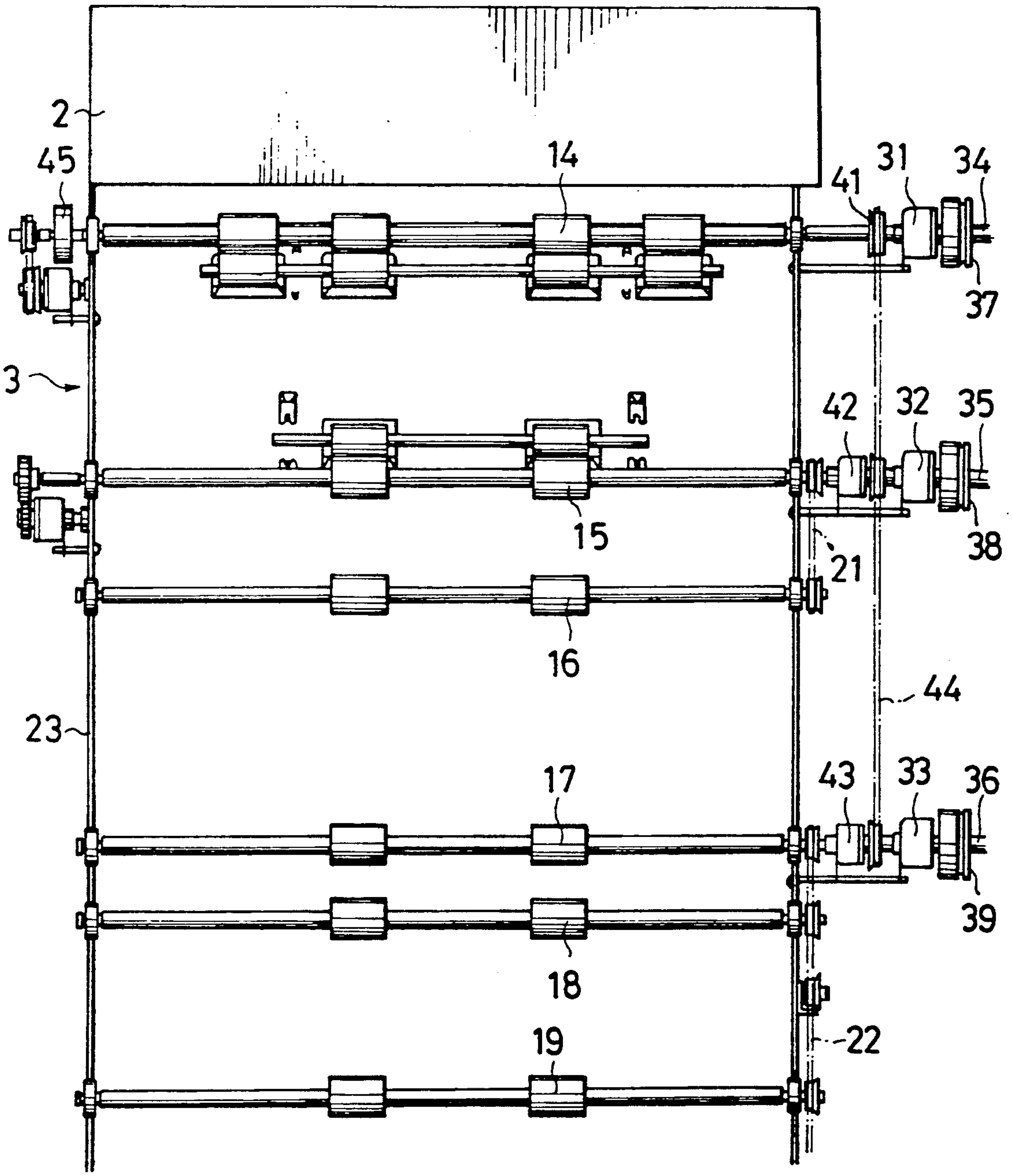
FIG. 2, is a schematic front view showing the sheet transporting unit of FIG. 1.

FIG. 2 shows the coupled condition of the rollers in the sheet transporting unit 3 by its schematic front view, and coupled driving shafts of driving source of the main body 1.

In FIG. 2, electro-magnetic coupling clutches 31, 32 and 33 of a coupling input type are attached to the ends of roller shafts of the driving rollers 14, 15 and 17 respectively. The cluches 31, 32 and 33 are adapted to engage with driving couplings 37, 38 and 39 respectively, which are attached to the respective ends of driving shafts 34, 35 and 36 of the driving source in the main body 1, when the sheet transporting unit 3 is pushed and set in the mounted position in the main body 1 from its dismounted position.

Control signals, which are based on the signal from the sensors S1 to S4 and outputted from the control device (not shown) such as a microcomputer equipped in the main body 1, are inputted to the clutches 31, 32 and 33 respectively so as to transmit the driving forces from the driving shaft 34, 35 and 36 to the driving rollers 14, 15 and 17 respectively.

A timing pulley 41 is attached to the roller shaft of the first driving roller 14. Electro-magnetic clutches 42 and 43 of a timing pulley type for switching the coupling condition of the driving rollers 14, 15 and 17, are attached to the roller shafts of the second and third driving rollers 15 and 17, respectively.

A third timing belt 44 is wound on the timing pulley 41 and the timing pulleys of the clutches 42 and 43.

In the normal operating condition of the copying apparatus, the clutches 42 and 43 are kept in a OFF condition, that is to say, the timing pulleys of the clutches 42 and 43 are decoupled to the roller shafts of the driving rollers 15 and 17, and thus the driving rollers 14, 15 and 17 are kept to be decoupled to each other and independently rotated.

A rotation knob 45 is equipped to the end of the roller shaft of the first driving roller 14, which is to be manually operated in case of removing the jammed copying sheet as described later.

The transporting operation of the copying sheet in the sheet transporting unit 3 will be explained below with reference to FIG. 1.

For example, supposing that the second sheet supplying tray 5 is selected, and thus the copying sheet is supplied one by one from the second sheet suppling tray 5, the sheet supplying roller 8 and the third driving roller 17 are started to rotate. Then, the uppermost copying sheet in the second sheet supplying tray 5 is transported into the transporting path 13.

Then, the copying sheet is further transported upward by the fourth driven roller 20 and the second driven roller 18, which are coupled and integrally rotated with the third driving roller 17.

When the rear end of the transported copying sheet passed the sensor S4, which is disposed in the vicinity of the second driven roller 18, the signal outputted from the sensor S4 is changed from the ON condition to the OFF condition. Then, by the control of the control device based on this signal change, the third driving roller 17 is stopped to rotate, while the second driving roller 15 is staarted to rotate.

By this change of the driving condition, the copying sheet is further transported upward by the second driving roller 15 and the first driven roller 16 which is coupled and intergrally rotated with the second driving roller 15, until the tip of the copying sheet arrives at the position where it contacts with the first driving roller 14 which is in a stop condition.

At this condition, the rotation of the second driving roller 15 is kept on so as to press the copying sheet from the behind, until the signal from the sensor S2, which is positioned in the vicinity of the second roller 15, is changed from the ON condition to the OFF condition. Accordingly, the copying sheet is bent at its central portion in the transporting path 13 just before the first driving roller 14.

This control manner of the driving condition brings an advantage of curing the inclination of the transported copying sheet with respect to the transporting direction, which is more or less caused during the transportation in the transporting path 13. Consequently, such a condition is achieved that the tip edge of the copying sheet, which is in parallel with the first driving roller 14 and contacts with the first driving roller 14, is held between the first driving roller 14 and the second driving roller 15.

From this condition, the first driving roller 14 is started to rotate by the control device in such a timing that the tip of the toner image formed on the photo-sensitive drum 2 coincides with the tip of the transported copying sheet. Then, the toner image is transferred onto the copying sheet in the appropriate timing at the lower portion of the photo-sensitive drum 2 as the photo-sensitive drum 2 rotates.

The copying sheet, on which the toner image is transferred, is then transported to fixing rollers 47*a* and 47*b* by a suction belt 46, where the copying sheet undergoes the fixing operation of the toner image as the fixing rollers 47*a* and 47*b* rotate.

Since the sheet transporting unit 3 is divided into three transporting sections along the transporting path 13, the copying sheet can be started to be transported before the completion of the transportation of the previous copying sheet.

Namely, for example, the lower transporting section i.e. the third driving roller 17 may start transporting the copying sheet while the previous copying sheet is stopped at the upper transporting section i.e. at the first driving roller 14 in the condition contacting with the first driving roller 14. Further, under the condition that such a previous copying sheet exists in the upper transporting section, the change of the driving operation from the lower transporting section to the intermediate transporting section may be set in a waiting condition while the lower transporting section, in which a certain amount of slip in the transmission of the driving force is introduced, is kept on driving, so that the following copying sheet is positioned just before the first driven roller 16 and is ready to be transported by the first driven roller 16 right after the previous copying sheet is discharged from the upper transporting section.

Accordingly, the sheet supplying speed can be effectively increased, and thus the copying speed of the copying apparatus can be resultantly increased.

The removing operation of the jammed copying sheet in the present embodiment is explained hereinafter.

Under the normal condition, the time duration for the transported copying sheet to pass each of the sensors S1, S2, S3 and S4 i.e. the time duration of the ON condition of the signal from each sensor S1, S2, S3 and S4 is supposed to be a prescribed constant value.

When this time duration for the transported copying sheet to pass eaach of the sensors S1, S2, S3 and S4 exceeds this prescribed time duration in the copying operation, the control device of the main body 1 judges that a jamming etc. of the copying sheet has occurred. At this time, the control device stops the driving operation of the driving rollers 14, 15 and 17, and displays an waarning message of "sheet jamming" by means of the front display panel (not shown), so as to urge the operator to remove the jammed sheet. At the same time, the control signal outputted from the control device is given to the clutches 42 and 43 so that the clutches 42 and 43 couple the driving rollers 14, 15 and 17 to each other via the thrid timing belt 44.

As a result, after the sheet transporting unit 3 is drawn out of the main body 1, in order to move the jammed sheet to some position where the jammed sheet can be easily removed, all of the rollers along the transporting path 13 can be simultaneously rotated just by manually rotating the knob 45, because the coupling condition of all the rollers is achieved via the timing belts 21, 22 and 44. Consequently, the removing operation of the jammed sheet can be easily and speedily performed in the present embodiment.

Such an advantage of the present invention can be made clear by comparing it with the aforementioned related art device, in which the rotations of the plurality of rollers along the transporting path are to be done independently by rotating each of the rollers, with a result that a time consuming and troublesome operation is necessary to remove the jammed sheet. As described above, the coupling means of the present invention is composed of the timing pulley 41, the clutches 42 and 43, aand the third timing belt 44. However, the coupling means can be composed of other elements which have the same function of selectively coupling and decoupling the driving and driven rollers on request.

In the above desribed embodiment, the sheet transporting unit is equipped in the copying apparatus for transporting the copying sheet. However, the sheet transporting unit may be utilized in an apparatus other than the copying apparatus, or as a device for transporting a sheet other than the copying sheet.

As described above, according to the present embodiment, when the abnormal condition, such as a jamming condition, occurs, the removing operation of the transported copying sheet can be performed quite easily by coupling the driving rollers 14, 15 and 17, while the normal transporting operation can be performed with a high transporting efficiency by decoupling the driving rollers 14, 15 and 17.

Many widely different embodiments of the present invention may be constructed without departing from the spirit and scope of the present invention. It should be understood that the present invention is not limited to the specific embodiments described in this specification, except as defined in the appended claims.

What is claimed is:

1. A sheet transporting apparatus for transporting a sheet from a sheet supplying device to a sheet supplied device comprising;
   - a transporting path through which said sheet is transported;
   - a plurality of driving rollers disposed along said transporting path for transporting said sheet each of which is rotated by each independently transmitted driving force;
   - a sensing means disposed along said transporting path for sensing a transporting condition of said sheet;
   - a coupling means for decoupling said driving rollers from each other, when a normal transporting condition is sensed by said sensing means, to allow said driving rollers to transport said sheet by sequentially rotating in a prescribed manner based on a position of said sheet sensed by said sensing means, and for coupling said driving rollers to each other when an abnormal transporting condition is sensed by said sensing means; and
   - a rotating means for rotating one of said driving rollers to remove said sheet from said transporting path when said abnormal transporting condition is sensed.

2. A sheet transporting apparatus according to claim 1, wherein said rotating means comprises a knob connected to a shaft of one of said driving rollers for manually rotating said shaft.

3. A sheet transporting apparatus according to claim 1, wherein said each independently transmitted driving force is independently transmitted from a driving source to each of said driving rollers via a clutch which is adapted to couple said driving roller to said driving source in said normal transporting condition, and decouple said driving roller to said driving source when said abnormal transporting condition is sensed.

4. A sheet transporting apparatus according to claim 3, wherein said clutch comprises an electro-magnetic coupling clutch.

5. A sheet transporting apparatus according to claim 1, wherein said sensing means comprises a plurality of sensors disposed along said transporting path.

6. A sheet transporting apparatus according to claim 1, wherein said coupling means comprises a timing pulley which is connected to one of said driving rollers, an electro-magnetic coupling clutch of a timing pulley type which is connected to the other of said driving rollers, and a timing belt which is wound on said timing pulley and a pulley portion of said clutch.

7. A sheet transporting apparatus according to claim 1, further comprising a plurality of driven rollers each of which is disposed along said transporting path and coupled to one of said driving rollers for transporting said sheet in cooperation with said driving rollers.

8. A sheet transporting apparatus according to claim 7, wherein each of said driven rollers is coupled with said driving roller by a timing belt.

9. A sheet transporting apparatus according to claim 1, wherein said transporting path includes a plurality of entrances, at which said sheet is supplied into said sheet transporting apparatus from said sheet supplying device, and an exit at which said transported sheet is discharged from said sheet transporting apparatus to said sheet supplied device.

10. A sheet transporting apparatus according to claim 1, wherein said sheet supplying device comprises a sheet supplying tray of a copying apparatus for supplying a recording sheet, said sheet supplied device comprises an image forming device of said copying apparatus for forming an image on said recording sheet, and said sheet transporting apparatus is mounted in a main body of said copying apparatus so as to transport said recording sheet.

11. A sheet transporting apparatus according to claim 10, further comprises a pair of side plates opposed to each other, between which said driving rollers are rotatably equipped, wherein said main body of said copying apparatus is provided with a pair of slide rails extending sideward, and said side plates are slidably set on said slide rails, such that said sheet transporting apparatus can be drawn out of said main body along said slide rails to allow a removal of said recording sheet from a midway of said transporting path.

* * * * *